J. FLINNER.
AMUSEMENT DEVICE.
APPLICATION FILED AUG. 5, 1918.
1,388,420.
Patented Aug. 23, 1921.
3 SHEETS—SHEET 1.
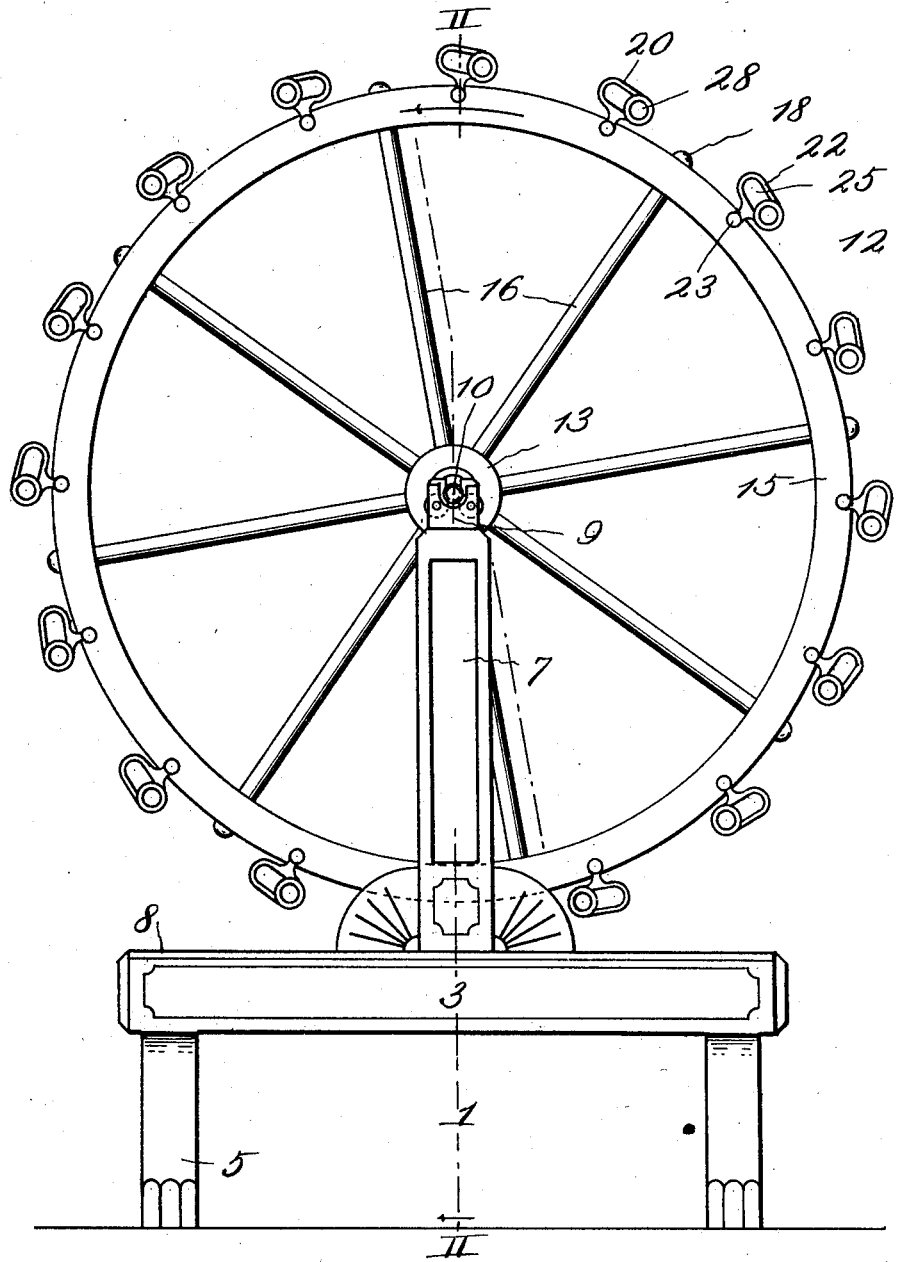

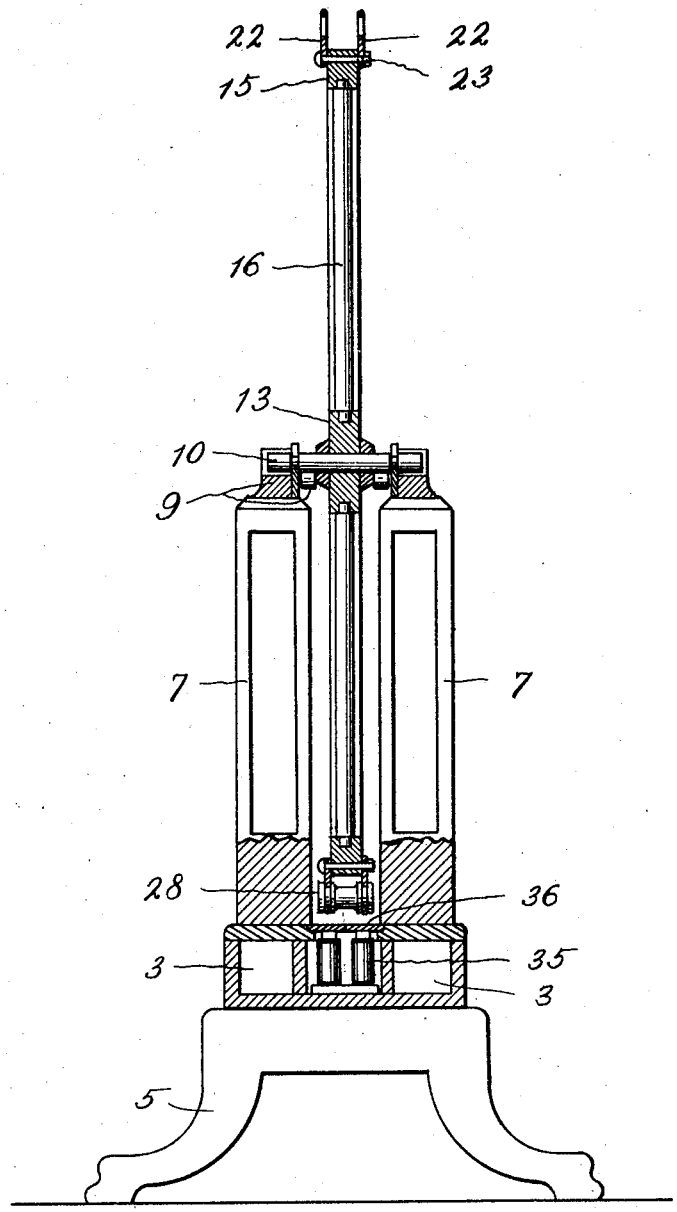

J. FLINNER.
AMUSEMENT DEVICE.
APPLICATION FILED AUG. 5, 1918.
1,388,420.
Patented Aug. 23, 1921.
3 SHEETS—SHEET 3.
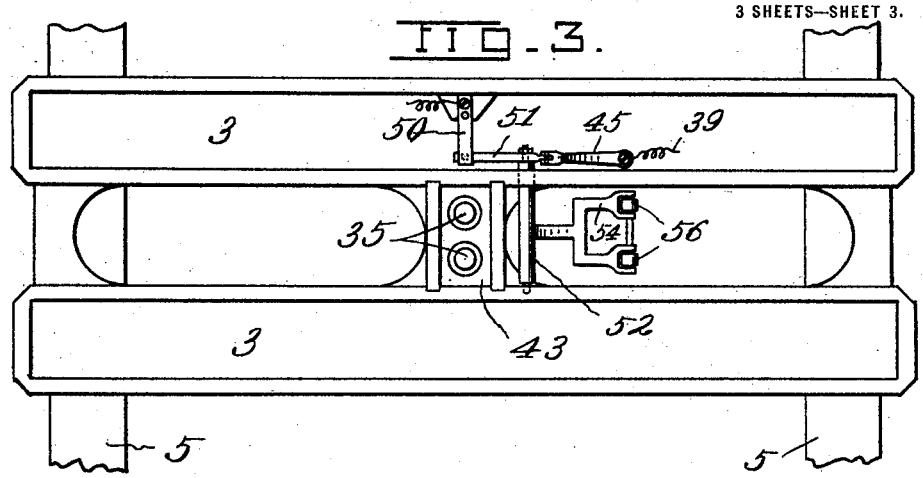
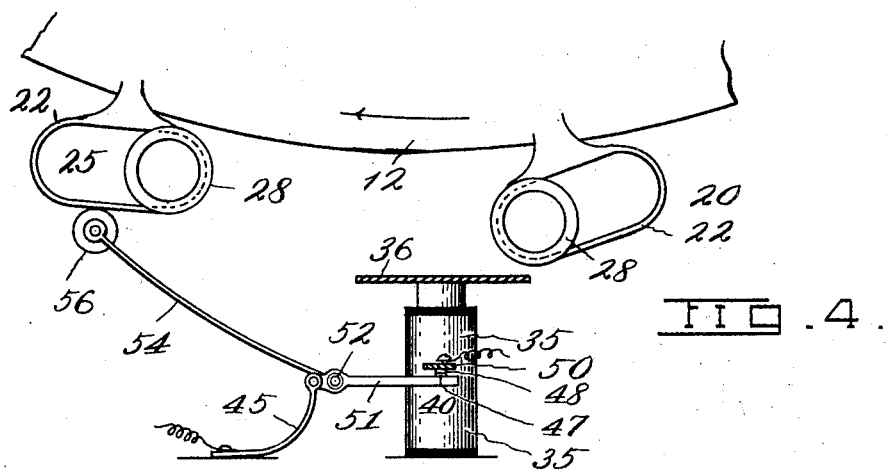
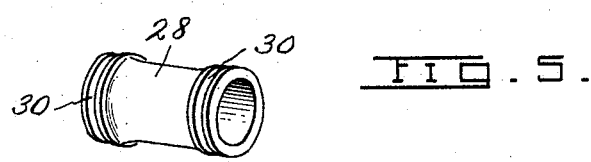
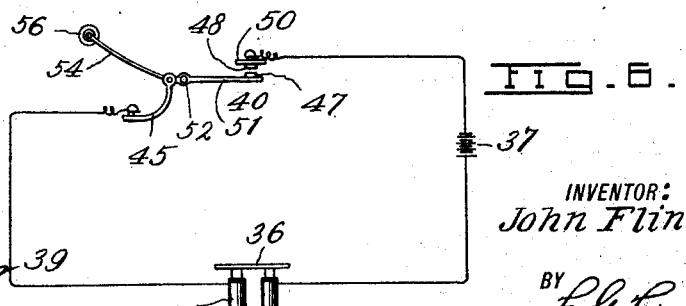
WITNESS
L. J. Fischer
INVENTOR:
John Flinner,
BY
F. G. Fischer,
ATTORNEY dir
UNITED STATES PATENT OFFICE.

JOHN FLINNER, OF LEAVENWORTH, KANSAS.

AMUSEMENT DEVICE.

1,388,420. Specification of Letters Patent. Patented Aug. 23, 1921.

Application filed August 5, 1918. Serial No. 248,310.

*To all whom it may concern:*

Be it known that I, JOHN FLINNER, a citizen of the United States, residing at Leavenworth, in the county of Leavenworth and State of Kansas, have invented certain new and useful Improvements in Amusement Devices, of which the following is a specification.

My invention relates to amusement devices and one prominent feature resides in a wheel which apparently is self-propelling, the actual motive force being concealed from view.

The invention may be used to advantage for advertising, exhibition and other useful purposes, and in order that said invention can be readily understood reference will now be made to the accompanying drawings, in which:

Figure 1 is a side elevation of the device.

Fig. 2 is an irregular section on line II—II of Fig. 1.

Fig. 3 is a plan view of the base of the device with the lid and parts mounted thereon removed.

Fig. 4 is an enlarged, fragmentary side elevation, partly in section of certain features employed in carrying out the invention.

Fig. 5 is a detail perspective view of a roller weight, a number of which are employed.

Fig. 6 is a diagram of an electric circuit embodied in the invention.

In carrying out the invention, I employ a suitable base 1, consisting in the present instance of a pair of horizontal compartments 3 spaced a short distance apart, and legs 5 upon which said compartments are mounted.

A pair of pillars 7 spaced apart rest upon the lids 8 of the compartments 3 and are provided at their upper ends with suitable bearings 9, in which an axle 10 is journaled.

A vertical wheel 12 made of wood or other suitable nonconducting material is fixedly-mounted upon the axle 10 and constitutes one of the prominent features of the invention. Said wheel 12 consists in the present instance of a hub 13, a rim 15, and spokes 16 connecting the hub 13 and said rim 15. The wheel is rendered attractive for advertising and exhibition purposes by peripheral ornaments 18, and may be painted in stripes and brilliant colors.

Tracks 20 are spaced about the rim 15 at regular intervals and comprise endless rails 22 rigidly secured to said rim 15 by suitable means, such as bolts 23. The rails 22 project beyond the periphery of the rim 15 and are arranged at an acute angle thereto to dispose one end of the opening 25 in each rail a greater distance than its opposite end from such periphery, as disclosed by Figs. 1 and 4.

Weights 28 in the form of rollers extend through the openings 25 in the rails 22 and have peripheral grooves 30 to retain them in place on said rails as the wheel 12 revolves. With the foregoing arrangement, it is apparent that when the wheel 12 rotates in the direction of the arrow, Fig. 1, the weights 28 will roll to the ends of the rails 22 farthest from the periphery of the rim 15, as they descend at the left side of said wheel, while the weights 28 ascending at the right side of the wheel will roll to the ends of the rails nearest the periphery of the rim and thus apparently unbalance the wheel 12 and cause it to rotate perpetually.

The real motive force, however, is concealed from casual observation and embodies an electromagnet 35, an armature 36 arranged in contact with the upper poles of said electromagnet 35, a source of electromotive force 37, a circuit 39, and a circuit breaker 40 to intermittently interrupt the current passing through said circuit 39.

The electromagnet 35 is, preferably, placed in a chamber 43 interposed between the two compartments 3, and the armature 36 is fixed to the lids 8 in such position that when said lids are in place on the compartments 3 the armature 36 will contact the upper poles of the electromagnet 35, as disclosed by Fig. 2.

The source of electromotive force 37 may be derived from any suitable point, but consists, preferably, of storage batteries arranged in the compartments 3.

The circuit breaker 40 is normally held in open position by a spring 45, which also acts as a conductor when the contact points 47 and 48 of said circuit breaker are in closed position. The contact point 48 is carried by a flat spring 50, while the contact point 47 is carried by an arm 51 mounted on a pivot 52, journaled in the two adjacent walls of the compartments 3. Said pivot 52 has a lever 54 extending upwardly and rearwardly from between the compartments 3 and provided at its upper ends with antifriction rollers 56, arranged in the path of the rails 22.

With the parts arranged as more clearly disclosed by Figs. 1 and 4, it is apparent that when the wheel is set in motion the circuit breaker 40 is successively closed by each pair of rails 22 as they strike and depress the rollers 56. Each time the circuit breaker 40 is closed the electromagnets 35 and the armature 36 are energized and attract the following track and its weight 28 and in this way the wheel 12 is kept constantly rotating. As each weight 28, which consists preferably of soft iron, passes over the central portion of the armature 36 the preceding weight 28 passes out of engagement with the rollers 56 and permits the circuit breaker 40 to open, whereupon the electromagnet 35 and the armature 36 become deënergized and exert no backward pull upon the weight 28 and the track 20 passing over said armature 36. The momentum acquired by the wheel 12 carries it around until the circuit is again closed and another momentary pull is exerted upon said wheel by an electromotive impulse as above-described.

From the foregoing description, it is apparent that I have produced an amusement device possessing the advantages above enumerated and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In a device of the character described, a suitably journaled wheel, magnetic means adjacent the periphery of said wheel, a circuit breaker in circuit with said magnetic means, and elements spaced about the rim of the wheel to be attracted by the magnetic means and rotate said wheel and successively close the circuit breaker, said elements being mounted to move outwardly at the descending side of the wheel and inwardly at the ascending side of said wheel.

2. In a device of the character described, a vertical wheel, a suitable axis for said wheel, spaced elements on the wheel arranged at an angle to the periphery thereof, weights operably-mounted in said elements to move outwardly on the descending side of the wheel and inwardly on the ascending side of said wheel, and means to rotate the wheel.

3. In a device of the character described, a vertical wheel, a suitable axis for said wheel, spaced endless rails on the wheel arranged at an angle to the periphery thereof, rollers operably-mounted in said endless rails to move outwardly on the descending side of the wheel and inwardly on the ascending side of said wheel, and electric means coacting with said rollers to rotate the wheel.

In testimony whereof I affix my signature in the presence of two witnesses.

JOHN FLINNER.

Witnesses:
F. G. FISCHER,
L. J. FISCHER.